Jackson R. Claycomb
INVENTOR

BY William J. Beard
ATTORNEY

United States Patent Office 3,488,629
Patented Jan. 6, 1970

3,488,629
PRESSURE WAVE NOISE FILTER WITH REFLECTION SUPPRESSION
Jackson R. Claycomb, Houston, Tex., assignor to Schlumberger Technology Corporation, New York, N.Y., a corporation of Texas
Filed Dec. 12, 1968, Ser. No. 783,233
Int. Cl. G01v 1/40
U.S. Cl. 340—18                               12 Claims

ABSTRACT OF THE DISCLOSURE

Disclosed is a fluid pressure wave noise filter for use in detecting pressure pulse signals in the drilling fluid line from a downhole signalling device while drilling a well in the presence of noise due to the drilling mud pump. Pump noise impulses are filtered from the drilling fluid line by supplying them simultaneously to both inputs of a differential pressure detecting means. Downhole signals are supplied to the inputs of the differential pressure detecting means at different times and are thereby detected. Additionally, the noise filter of the present invention has a one way check valve equipped pressure equalizing line between the inputs of the differential pressure detecting means to eliminate possible spurious signal detections due to differential pressure transients caused by the reflection of pressure pulses from one input of the differential pressure detecting means.

Background of the invention

This invention relates to data transmission systems and more particularly to data transmission systems for use in transmitting data from the bottom of a well bore to the surface while drilling the well.

It has long been recognized in the oil industry that the obtaining of data from downhole during the drilling of a well would provide valuable information which would be of interest to the drilling operator. Such information as the true weight on the bit, the inclination of the borehole, fluid pressure and temperature at the bottom of the hole and the radioactivity of the substances surrounding or being encountered by the drill bit would all be quantities of interest to the drilling operator. A number of prior art proposals to measure these data while drilling and transmit information pertaining to such data to the surface have been made. Various transmission schemes have been proposed in the prior art for so doing. Among the prior art proposals has been the use of drill pipe as an electrical conductor to transmit electrical signals to the surface, the transmission of sonic signals to the surface through the drill pipe, the release of radioactive or colored die markers in the drilling fluid which is circulated in the well bore and several schemes for pressure pulse signalling through the drilling fluid. None of these prior art proposals have led to a practical solution for various reasons.

Perphaps the most promising of the prior art suggestions in a practical sense has been that of signalling by pressure pulses in the drilling fluid. However, this approach has suffered the limitation of having the presence of a high ambient noise level in the signalling system because of the pressure pulses introduced into the drilling fluid by the pump system which is used to circulate the drilling fluid. In a typical drilling arrangement a large pump located at the surface is used to pump drilling mud down the drill stem, through the bit, and back to the surface in the annulus between the drill stem and the wall of the well bore. Naturally, in order to circulate such large quantities of mud as are necessary to completely fill a deep well bore a very powerful pump must be used. These pumps may be typically several hundred horsepower and circulate the drilling mud at a rate of 20 to 30 barrels per minute. Typically, such pumps operate by having a large reciprocating piston produce pressure impulses in the mud line thereby forcing the mud down the drill stem into the well bore. It is precisely these impulses which interfere with the reception of relatively low level pressure pulses from the downhole pressure pulse signalling system which is associated with the downhole measuring equipment in a measurement while drilling system. In order for such a pressure pulse signalling system to be useful in transmitting data from downhole measuring instruments, some means must be provided to discern the data signal in the midst of the pumping noise.

Such a pump pressure pulse noise filter is disclosed in a copending application entitled Pressure Wave Noise Filter by Roger Q. Fields which is assigned to the assignee of the present application. In developing the pressure pulse noise filter of the aforesaid copending application, problems were encountered due to pressure transients caused by the reflection of pressure waves in flow lines comprising the noise filter of that application. Such pressure transients could possibly lead to spurious signal detections.

Accordingly, it is an object of the present invention to provide an improved pressure wave noise filter which eliminates pressure transients due to reflected pressure waves in the fluid flow lines of the pressure wave noise filter.

A further object of the present invention is to provide a pressure wave noise filter which effectively cancels pressure pulses due to the mud pump but effectively detects pressure pulses due to a downhole pressure pulse signalling device and further eliminates any spurious signal detections which may be interpreted as signals from the downhole pressure pulse signalling device by eliminating pressure transients due to reflections of the pump pressure pulses in the flow lines comprising the noise filter.

Brief description of the invention

In accordance with the objects of the present invention, a pressure wave noise filter is supplied which effectively cancels pressure pulse noise due to the mud pump and permits downhole pressure pulse signals from a measuring instrument to be detected at the surface. Pressure pulses due to the pump are effectively cancelled by providing a differential pressure detecting means in fluid pressure communication with the mud line, and having two equal lengths paths of pressure communication to its opposite inputs as seen from the pump side, but which has two unequal length pressure paths to its opposite inputs as seen from the downhole tool side. By providing equal length paths to the opposite inputs of the differential pressure detecting means from the pump, pressure waves generated by the pumping action of the pump arrive on opposite sides of the detector simultaneously and thereby cancel each other as no differential pressure is produced across the differential pressure detector. On the other hand, pressure pulse signals is arriving from the downhole signalling device arrive sooner at one input than at the other and hence produce a differential pressure across the detector which is detected. Further, a check valve pressure equalizing system in the present invention eliminates pressure transients which may be encountered due to the reflection of pressure pulses within the flow lines comprising the noise filter.

The novel features of the present invention are set forth with particularity in the appended claims. The present invention both as to its organization and manner of operation, together with further objects and advantages thereof, may best be understood by way of illustration and examples of embodiments when taken in conjunction with the accompanying drawings.

Description of the preferred embodiment

The present invention relates to data transmission systems for use in drilling operations on a well to provide downhole data which may be measured while drilling the well. More particularly, the present invention deals with a means for removing pump noise in order that pressure pulse signals representative of data from a downhole measuring instrument may be received at the surface and, further, eliminates pressure transients due to reflections of the pressure pulses within the flow lines comprising the aforesaid noise filter.

Figure 1:
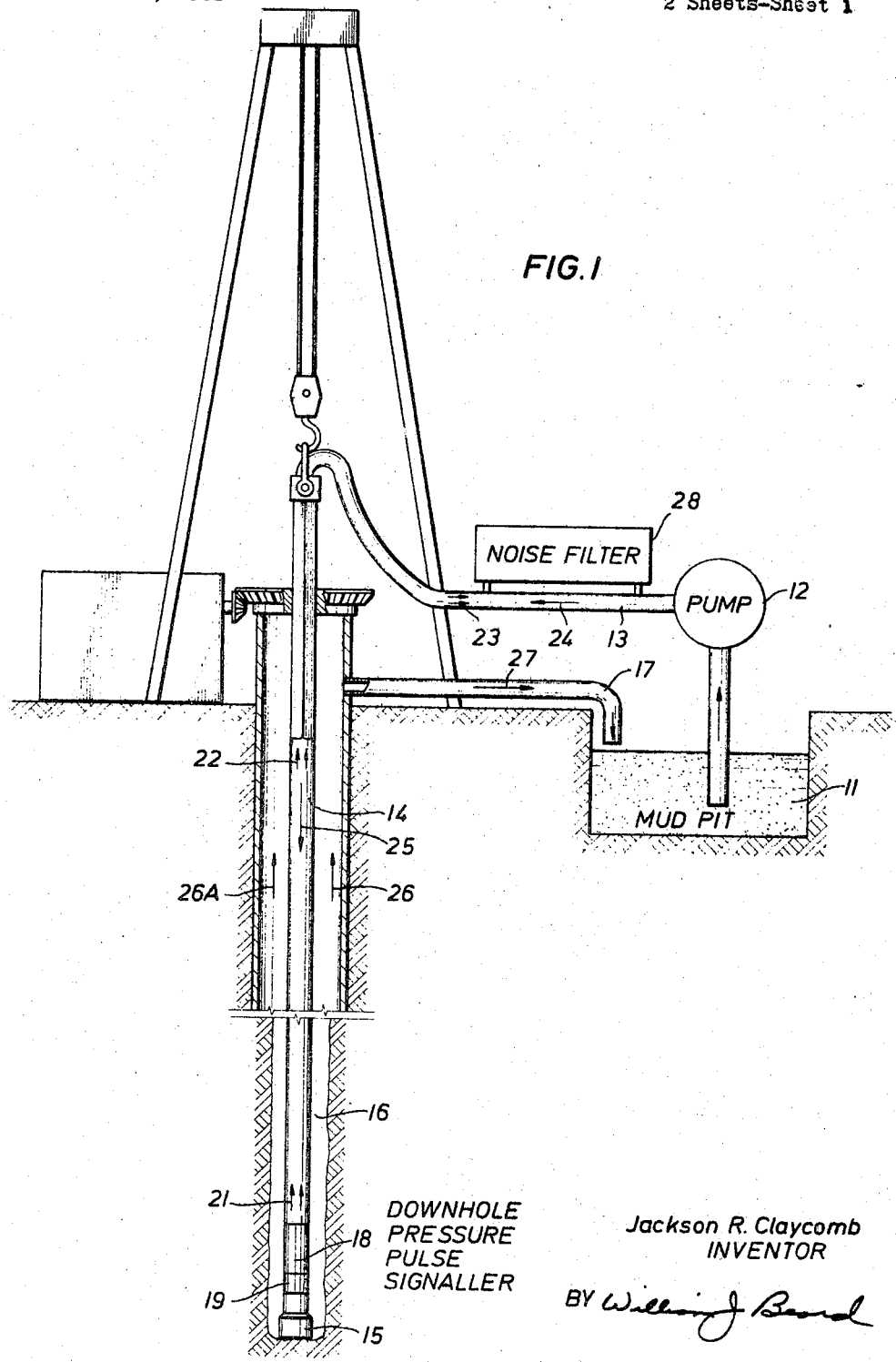
FIG. 1 is a schematic illustration showing the present invention in use in conjunction with a downhole pressure pulse signalling device.

Referring now to FIG. 1 the operation of the present invention in a typical drilling arrangement is illustrated schematically. Drilling mud is picked up from mud pit 11 by pump 12, which may be a pump of the piston reciprocating type, and circulated through mud line 13, down through the drill string 14, through the drill bit 15, and back to the surface in the annulus 16 between the drill stem and the wall of the well bore. Upon reaching the surface, the mud is discharged through line 17 back into the mud pit where cuttings of rock or other well debris are allowed to settle out before the mud is recirculated.

A downhole pressure pulse signalling device 18 is attached to the drill stem for transmission of data signals derived during the drilling operation by the measurement instrument package 19. Signalling device 18 may be of the valve or variable orifice type which generates pressure pulses in the drilling fluid by varying the speed of flow. Such data may be encoded in a desired form by appropriate electronic means in the downhole tool. Arrows 21, 22 and 23 illustrate the path taken by the pressure pulses provided by the downhole signalling device under typical well conditions. Pump 12 also produces pressure pulses in the mud line and these are indicated by arrows 24, 25, 26 and 26a which also illustrate the flow of the mud through the well bore.

In order for the downhole pressure pulse signals to be discernible at the surface, some means must be provided to remove pressure pulses due to the pump and effectively permit detection of the pressure pulses due to the downhole signalling device. This means is provided by the apparatus of the present invention, a noise filter 28 located adjacent to pump at the surface. The operation of noise filter 28 is more easily explained by reference to FIGS. 2 and 3.

Figure 3:
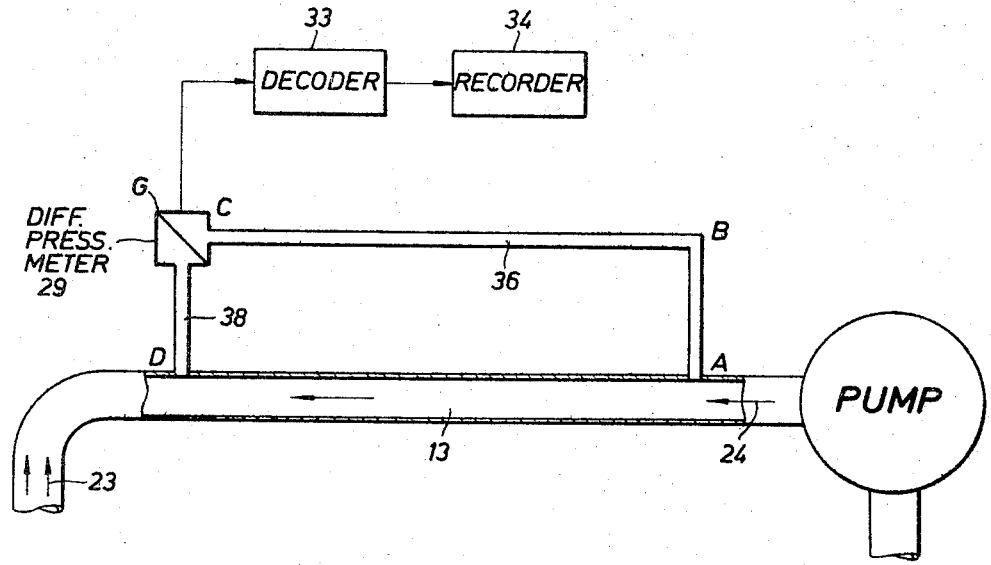
FIG. 3 shows an embodiment of a pressure wave noise filter in which reflection problems may be encountered due to the geometry of the system.

Referring now to FIG. 3 a pressure impulses due to the pumping action of the pump 24 appearing at point A may travel two paths to reach differential pressure meter 29, which may typically be of the diaphragm type having two fluid pressure inputs and which detects a pressure differential between the fluid on one side of the diaphragm and that on the other side of the diaphragm and produces an electrical output which is indicative of this pressure difference. If each of these two paths are made of an equal length, then the pump pressure waves arriving at the inputs of meter 29 will arrive at opposite sides of the pressure sensitive diaphragm of the meter at the same time and thereby cancel each other. A first path which such pressure waves may take is that A, B, C of FIG. 3 and a second is A, D, C of FIG. 3. Thus, if pump pressure impulses following paths A, B, C and A, D, C arrive on opposite sides of the diaphragm of pressure meter 29, the net effect, since the two path lengths are equal, will be to produce no differential pressure across the diaphragm of meter 29 and hence no output from the meter.

On the other hand, pressure pulses arriving from the downhole tool in mud line 13 as shown by arrows 23 will travel two unequal length paths to get to the opposite inputs of meter 29. Since these two paths are not of equal length, a pressure pulse arriving from the downhole tool will generate a pressure differential across the diaphragm of pressure meter 29 and hence will produce an output from the water. The meter output may then be decoded by appropriate decoding circuit means 33, and recorded as desired by recording means 34. Such data may, for instance, comprise binary numbers which represent certain parameters of interest to the driller measured by downhole instrumentation package 19 and transmitted by downhole pressure pulse signalling device 18 to the surface.

Difficulties due to the reflection of pump pressure pulses have been observed in the flow lines comprising a pressure wave noise filter as shown in FIG. 3. For example, although pump pressure impulses travelling paths A, B, C and A, D, C arrive at opposite sides of the differential pressure meter 29 diaphragm simultaneously, a reflection of the pump pressure pulse back from point C to point B can cause a transient pressure differential to exist across the diaphragm of pressure meter 29 and provide a spurious indication of a downhole signal as follows:

When the pump pressure pulse arrives at the diaphragm of meter 29, it is reflected back down line 36 from point C toward point B. Because of the relatively long duration of the pump pressure pulses, the reflected portion travelling from point C toward point B encounters a portion of the pressure pulse still travelling from point B toward point C. This condition leads to the existence, for a brief time, of a pressure transient at point C in line 36 in which the pressure is twice that in line 38, where no corresponding reflection occurs. This situation thus causes a differential pressure to exist across the meter 29 diaphragm which could be spuriously interpreted as a signal from downhole. The apparatus shown in FIG. 2 is designed to alleviate such problems.

Figure 2:
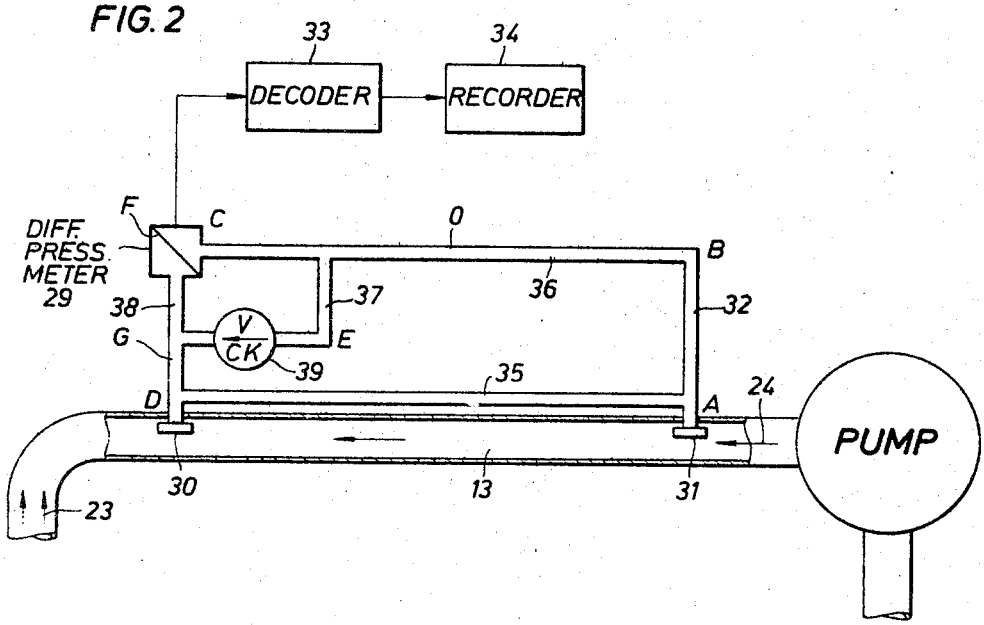
FIG. 2 is a schematic illustration showing the present invention in use with a downhole signalling device attached to the mud line.

In the embodiment shown in FIG. 2, the noise filter is disclosed as a closed loop system which may be entirely filled with a clean fluid O such as water or clear oil. The use of a clean fluid in the system prevents contaminants which may be present in the drilling fluid itself from entering the system and possibly damaging such fragile parts as check valve 39 and differential pressure meter 29. Any clean fluid may be used so long as the propagation time of the pressure pulses through the drilling fluid line 13 from point A to point D is the same as the propagation time from point A to point D in line 35. If the propagation speed in the clean fluid used is significantly different from that in the drilling fluid, the length of line 35 may be adjusted accordingly to maintain the above mentioned relation.

The operation of the embodiment shown in FIG. 2 may be described as follows. A pump pressure impulse 24 present at point A can travel through two equal length paths to get to opposite sides of the diaphragm of differential pressure meter 29. A component of the pulse will travel path ADC through line 35 while the other component will travel path ABC through line 36. As these lines provide equal length paths for the pressure pulse components from the pump to travel, such components reach opposite sides of the diaphragm of the pressure meter 29 simultaneously, thereby producing no differential pressure across the diaphragm and hence no output from the meter.

As previously discussed, it has been discovered that pressure waves travelling path ABC may be reflected from the differential pressure meter back along path CB and could possibly give a spurious differential pressure indication from meter 29. Line 37 and check valve 39 are included to prevent such spurious readings occurring. Their operation may be described as follows.

A pressure transient produced by the pulse reflected back along path CB enters line 37 and hence may follow the short path CEF getting to the opposite side of the diaphragm of the differential pressure meter effectively at the same time. This occurs because check valve 39 permits flow of pressure only in one direction through line 37. Check valve 39 will not permit a higher pressure to exist in line 36 than in line 38 but will permit a higher pressure in line 38 than in line 36. Since check valve 39 only opens in one direction as mentioned, pressure pulses 23 arriving from the downhole pressure pulse signalling device cannot follow path DEC and thus cancel at the diaphragm of differential pressure meter 29. However, transients due to reflected pressure waves from the meter may flow through line 37 freely hence the pressure transient will arrive at opposite sides of the diaphragm of differential pressure meter 29 and hence produce no significant spurious output.

The addition of line 35 shown in the closed loop embodiment of FIG. 2 is necessary in order to prevent a pressure buildup in line 38. Line 35 establishes a fluid pressure communication between line 38 and lines 32 and 36. This permits pressure buildups due to high pressure transients admitted through check valve 39 into line 38 to be communicated back through line 35 to lines 32 and 36 and allows the system to come to pressure equilibrium between pump strokes. Without line 35, a higher pressure could build up in line 38 and hold valve 39 closed possibly damaging the diaphragm of meter 29.

Ignoring the effects of reflected pressure waves, the downhole pressure pulses from pressure signalling device 18 as indicated by arrows 23 can arrive at point D in flow line 13 and travel two paths of unequal lengths to get to differential pressure meter 29. Shorter path DC will be traversed by such a pressure pulse signal sooner than longer path DABC and thus will provide a differential pressure across the diaphragm of meter 29 and hence provide an electrical output signal from the meter. Diaphragms 30 and 31 provide pressure pulse communication between mud line 13 and the closed loop noise filter. Being flexible but non-porous, they also retain clean fluid O within the closed loop noise filter and prevent the larger contaminating particles which may be present in the mud stream from damaging sensitive parts of the system such as check valve 39 and differential pressure meter 29.

Summarizing, the embodiment shown in FIG. 2 including flow line 37 and check valve 39 prevents the detection of spurious signals due to pressure transients caused by reflected pressure pulses in line 36 and hence enhances the accuracy of the pump pressure wave noise filter. The effectiveness of such a filter is illustrated in the earlier mentioned copending application in which it has been shown that downhole pressure pulses such as sent by a downhole pressure signalling device 18 at a rate in excess of 10 pulses per second may easily be detected above the ambient noise level produced by a typical mud pump at the surface over depths of 13,000 feet or greater.

What is claimed is:

1. Apparatus for detecting pressure pulse signals in the drilling fluid line from a downhole signalling device while drilling a well, comprising:
    means having at least two fluid pressure inputs for detecting pressure differentials between said inputs;
    means providing two equal length fluid pressure communication paths from a first point in the drilling fluid line to the inputs of said differential pressure detecting means;
    means providing two unequal length fluid pressure communication paths from a second point in the drilling fluid line to said inputs; and
    means for preventing fluid differential pressure transients between the inputs of said differential pressure detecting means due to reflection of fluid pressure pulses in said fluid communication paths;
    whereby, a pressure pulse going from said first point in the drilling fluid line toward said second point arrives simultaneously at said inputs of said differential pressure detecting means and is cancelled and a pressure pulse going from said second point in the drilling fluid line toward said first point does not arrive simultaneously at said inputs of said differential pressure detecting means and is detected.

2. Apparatus for detecting pressure pulse signals in the drilling fluid line from a downhole signalling device while drilling a well, comprising:
    means for detecting differential fluid pressure having two fluid pressure inputs and capable of detecting pressure differentials between said two inputs;
    first fluid pressure communicating means for providing a first fluid pressure path from a first point in said drilling fluid line to one of said fluid pressure inputs;
    second fluid pressure communicating means for providing a second fluid pressure path from a second point in said drilling fluid line to the other of said fluid pressure inputs, said first and second fluid pressure communicating means also being in fluid pressure communication with each other, said first and second pressure communicating means together with their interconnecting pressure communication forming two equal length paths from said first point in the drilling fluid line to said inputs of said differential pressure detecting means, but forming two unequal length paths from said second point in the drilling fluid line to said inputs of said differential pressure detecting means; and
    means for preventing differential fluid pressure transients due to reflections in said fluid pressure communication means, thereby allowing fluid pressure pulses in said drilling fluid line travelling from said second point toward said first point to be detected to the exclusion of fluid pressure pulses travelling from said first point toward said second point.

3. The apparatus of claim 2 wherein said means for preventing differential fluid pressure transients due to reflections includes an additional fluid pressure communicating means joining said first and second fluid pressure communication means and a one way check valve in said additional fluid pressure communicating means, said check valve permitting fluid pressure to flow from said first fluid pressure communicating means to said second fluid pressure communicating means but not vice versa.

4. Apparatus for effectively detecting pressure pulse signals from a downhole signalling device present in a drilling fluid line while drilling a well, comprising:
    a differential pressure meter having a first fluid pressure input and a second fluid pressure input and capable of detecting pressure differentials between said two inputs and generating output signals representative thereof;
    first fluid pressure communicating means for providing a first fluid pressure path from a first point in said drilling fluid line to one of said fluid pressure inputs;
    second fluid pressure communicating means for providing a second fluid pressure path from a second point in said drilling fluid line to the other of said fluid pressure inputs;
    third fluid pressure communicating means for placing said first and second fluid pressure communicating means in fluid pressure communication with each other;

fourth fluid pressure communicating means, including one way valve means, for permitting fluid pressure to communicate from said first fluid pressure communicating means to said second fluid pressure communicating means, but not vice versa, the fluid pressure path from said first point in said drilling fluid line through said first, third, and second fluid pressure communicating means to said second fluid pressure input being equal in length to the fluid pressure path from said first point in the drilling fluid line through said first fluid pressure communicating means alone to said first fluid pressure input, and the fluid pressure path from the second of said points in the drilling fluid through said second fluid pressure communicating means alone to said second pressure input not being equal in length to the fluid pressure path through said second, third and first fluid pressure communicating means to said first fluid pressure input;

whereby, fluid pressure pulses present at said first point in said drilling fluid line and travelling toward said second point will not be detected by said differential pressure meter, but fluid pressure pulses present at said second point in said drilling fluid line and travelling toward said first point will be detected by said differential pressure meter.

5. The apparatus of claim 4 wherein all of said fluid pressure communicating means are isolated from said drilling fluid line at said first and second points in said drilling fluid line by plural non-porous, flexible, diaphragms capable of transmitting fluid pressure pulses from said drilling fluid line into said fluid pressure communicating means.

6. The apparatus of claim 3 and further including a clean fluid filling all of said fluid pressure communicating means and capable of transmitting fluid pressure pulses.

7. The apparatus of claim 4 and further including means for decoding said output signal representative of said detected pressure differentials present at the inputs of said differential pressure meter.

8. The apparatus of claim 7 and further including recording means for recording said output signals.

9. The apparatus of claim 5 and further including means for decoding said output signals representative of said detected pressure differentials present at the inputs of said differential pressure meter.

10. The apparatus of claim 6 and further including means for decoding said output signals representative of said detected pressure differentials present at the inputs of said differential pressure meter.

11. The apparatus of claim 9 and further including recording means for recording said output signals.

12. The apparatus of claim 10 and further including recording means for recording said output signals.

References Cited

UNITED STATES PATENTS 3,302,457   2/1967   Mayes ------------ 340—18 X

RODNEY D. BENNETT, Jr., Primary Examiner

D. C. KAUFMAN, Assistant Examiner

U.S. Cl. X.R.

73—152, 392, 407; 137—557